US008290976B2

(12) United States Patent
Klein et al.

(10) Patent No.: US 8,290,976 B2
(45) Date of Patent: Oct. 16, 2012

(54) SYSTEMS AND METHODS FOR EXECUTING A NAVIGATION QUERY

(75) Inventors: Udo Klein, Maximiliansau (DE); Gerrit Simon Kazmaier, Metzingen (DE)

(73) Assignee: SAP AG, Walldorf (DE)

( * ) Notice: Subject to any disclaimer, the term of this patent is extended or adjusted under 35 U.S.C. 154(b) by 225 days.

(21) Appl. No.: 12/790,251

(22) Filed: May 28, 2010

(65) Prior Publication Data

US 2011/0295896 A1    Dec. 1, 2011

(51) Int. Cl.
*G06F 7/00* (2006.01)
*G06F 17/30* (2006.01)

(52) U.S. Cl. ........................ 707/769; 707/780

(58) Field of Classification Search .................. 707/780, 707/769, 771
See application file for complete search history.

(56) References Cited

U.S. PATENT DOCUMENTS

| 6,070,160 | A  | * | 5/2000  | Geary ................................ 1/1 |
| 7,991,787 | B2 | * | 8/2011  | Klein ............................ 707/780 |
| 8,015,196 | B2 | * | 9/2011  | Taranenko et al. ............ 707/758 |
| 2004/0006460 | A1 | * | 1/2004  | Katayama et al. .............. 704/10 |
| 2009/0259647 | A1 | * | 10/2009 | Curtis ............................. 707/5 |
| 2010/0332325 | A1 | * | 12/2010 | Holte ......................... 705/14.54 |
| 2012/0041903 | A1 | * | 2/2012  | Beilby et al. .................... 706/11 |

* cited by examiner

*Primary Examiner* — Merilyn Nguyen
(74) *Attorney, Agent, or Firm* — Finnegan, Henderson, Farabow, Garrett & Dunner LLP (57) ABSTRACT

Systems and methods consistent with the invention may include receiving a navigation query including input text, determining, via a processor, whether the input text is satisfies a predetermined criteria, generating a response including data representing a screen associated with the input text when the input text satisfies the predetermined criteria, selecting a language preference when the input text fails to satisfy the predetermined criteria, performing a fuzzy search based on the input text, the language preference, and usage history, and generating a response to the navigation query based on a result of the fuzzy search.

18 Claims, 6 Drawing Sheets

SYSTEMS AND METHODS FOR EXECUTING A NAVIGATION QUERY

BACKGROUND

1. Relevant Field

Systems and methods consistent with the present invention generally relate to managing execution of queries. More particularly, systems and methods consistent with the invention relate to managing execution of queries to navigate to various screens associated with transaction codes.

2. Background Information

Businesses and other organizations generate and/or receive a variety of entries, data items and electronic information (broadly referred to hereafter as "data objects") during the course of their operation. These data objects may belong to different classes and may be generated and/or received from various locations in different regions and/or countries. To organize and manage operations of the organization, data objects may be stored in storage devices located in a variety of locations. These data objects may be used to implement various screens or user interfaces for the organization. Each screen may include icons, user interface elements, maps, charts, and/or various similar items that may allow a user to perform various functions for managing operations of the organization.

Figure 1:
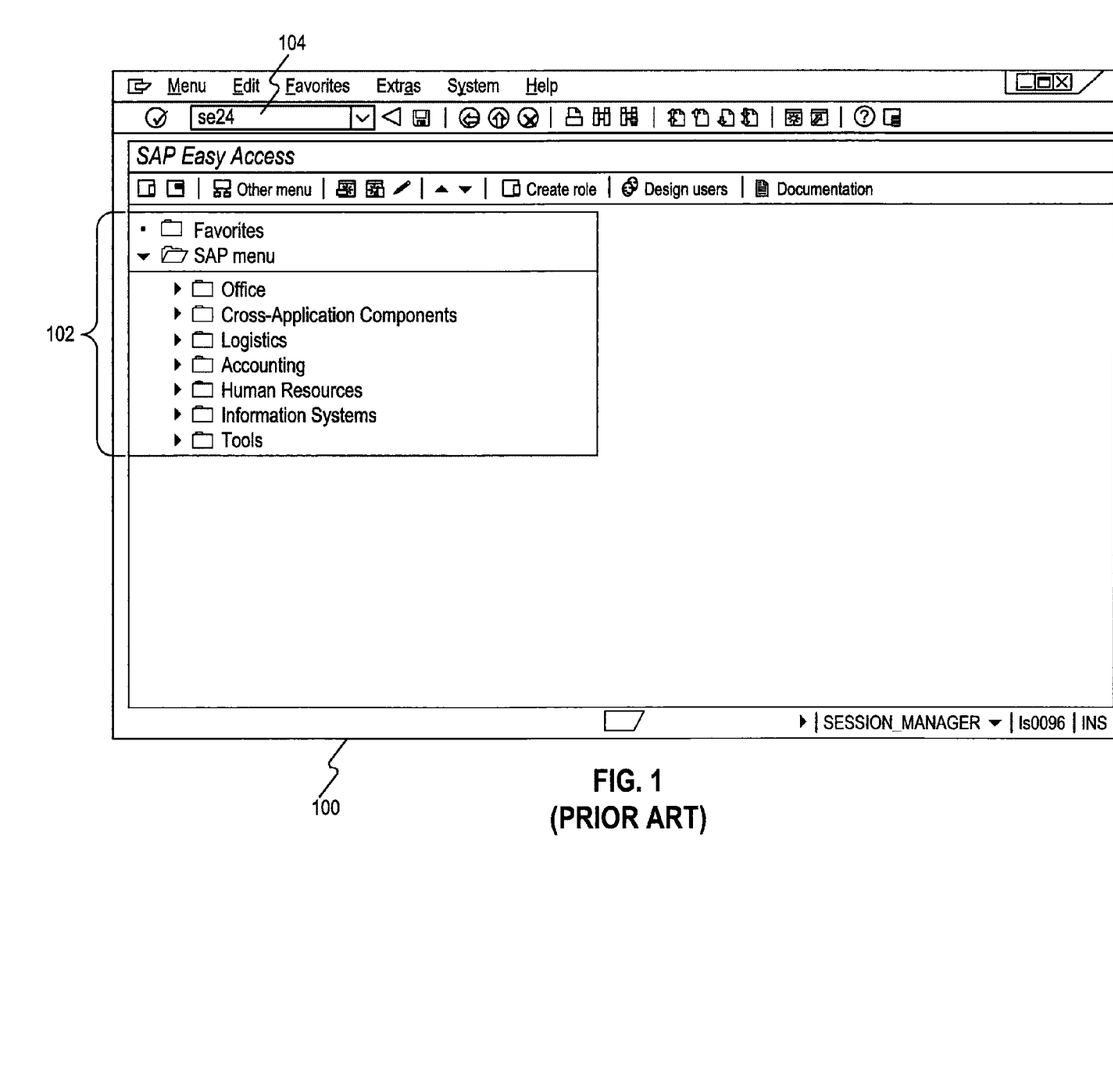
FIG. 1 illustrates a snapshot of a user interface screen used to navigate to a desired screen.

As operations of an organization increase and become more complex, the screens representing different views also increase in number and complexity. For example, FIG. 1 illustrates an SAP EasyAccess screen 100 that may include a menu 102 and an input field 104. To navigate to a different screen, a user may select an item included in menu 102. Selecting an item may then lead to additional items being represented on the screen 100, and the user may continue selecting until a desired screen is displayed. Requiring a user to navigate through complex menus and to select multiple items to reach a desired screen increases the amount of navigation time and may increase resource costs of an organization. Further, a customer of the organization who may be navigating through different screens to purchase an item may get frustrated and may abandon the transaction if he is unable to quickly navigate to the desired screen.

A user may also be able to navigate to a desired screen by inputting a transaction code in input field 104. For example, as is illustrated in FIG. 1, a user may input transaction code "se24" that may be associated with a specific screen. Each screen may be associated with a specific transaction code of a predetermined format that may be set by an administrator of an organization. A user may save time by entering a transaction code and directly navigate to the desired screen instead of selecting multiple items from menu 102. As the number of screens increase the number and complexity of associated transaction codes may also increase and it may be difficult for a user to remember the correct transaction codes. Further, an error may be returned when a user inputs an incorrect transaction code. Such a technique of navigating to a particular screen may also increase user frustration, the amount of navigation time, and resource costs of an organization.

In view of the foregoing, it is desirable to provide methods and systems for reducing the time and selections required to execute queries. For example, there is a need for improved methods and systems to manage navigation queries based on transaction codes more efficiently and by using less time-consuming techniques.

SUMMARY

In accordance with one embodiment of the invention, a method for executing a navigation query is provided. The method includes receiving a navigation query including input text; determining, via a processor, whether the input text satisfies a predetermined criteria; generating a response including data representing a screen associated with the input text when the input text satisfies the predetermined criteria; selecting a language preference when the input text fails to satisfy the predetermined criteria; performing a fuzzy search based on the input text, the language preference, and usage history; and generating a response to the navigation query based on a result of the fuzzy search.

Consistent with another embodiment of the present invention, there is provided a system for executing a navigation query. The system comprises a memory device having instructions to implement a fuzzy search engine; and a data processor for executing instructions to cause the fuzzy search engine to receive a navigation query including input text; determine whether the input text satisfies a predetermined criteria; generate a response including data representing a screen associated with the input text when the input text satisfies the predetermined criteria; select a language preference when the input text fails to satisfy the predetermined criteria; perform a fuzzy search based on the input text, the language preference, and usage history; and generate a response to the navigation query based on a result of the fuzzy search.

In accordance with another embodiment of the present invention, there is provided a computer-readable storage medium including instructions which, when executed on a processor, cause the processor to perform a method of executing a navigation query. The method comprises receiving a navigation query including input text; determining whether the input text satisfies a predetermined criteria; generating a response including data representing a screen associated with the input text when the input text satisfies the predetermined criteria; selecting a language preference when the input text fails to satisfy the predetermined criteria; performing a fuzzy search based on the input text, the language preference, and usage history; and generating a response to the navigation query based on a result of the fuzzy search.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the execution of navigation queries. Exemplary search engines may be used in systems consistent with the invention including those offered by SAP AG, such SAP NetWeaver®. SAP NetWeaver® may integrate information and business processes across technologies and organizations using Internet standards such as HTTP, XML, and Web services and may execute navigation queries based on transaction codes and by implementing a fuzzy search engine.

Figure 2:
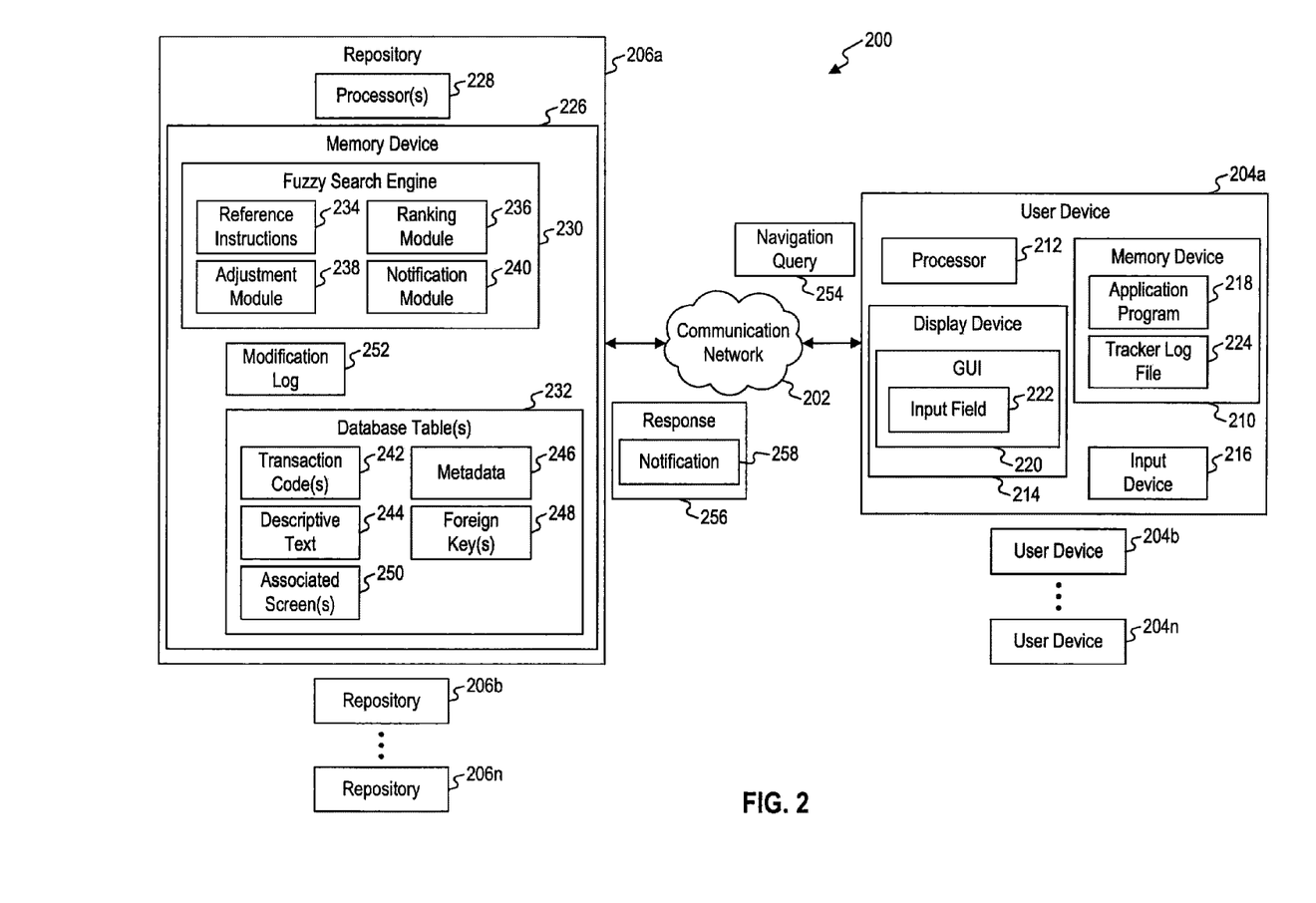
FIG. 2 illustrates an exemplary system for optimizing execution of navigation queries, consistent with the present invention.

For example, FIG. 2 illustrates an exemplary system 200, which may be implemented using an SAP NetWeaver®. As shown in FIG. 2, system 200 includes a communication network 202 that facilitates communication between a plurality of nodes 204a-n and 206a-n. Communication network 202 includes one or more network types, such as a wide-area network (WAN), a local-area network (LAN), or the Internet. Communication network 202 may operate by wireline and/or wireless techniques and may use transmission control protocol/internet protocol ("TCP/IP") or any other appropriate protocol to facilitate communication between nodes 204a-n and 206a-n of system 200. Network connections between the nodes of system 200 may be established via Ethernet, telephone line, cellular channels, or other transmission media.

Each node of system 200 comprises a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

Consistent with an embodiment of the present invention, nodes 204a-n may be user devices 204a-n and 206a-n of may be repositories 206a-n. User device 204a may be an appropriate device for sending, receiving, and presenting data. For example, user device 204a may include a personal computer, workstation, mainframe computer, notebook, global positioning device, and a handheld device such as a cellular phone and a personal digital assistant.

As is illustrated in FIG. 2, user device 204a may include a memory device 210, a processor 212, a display device 214, and an input device 216. Memory device 210 may be used to store instructions, such as an application program 218, which may be executed by processor 212 to cause user device 204a to implement a plurality of operations. For example, application program 218 may be executed on processor 212 to display a graphical user interface (GUI) 220 on display device 214. Input device 216 may be a keyboard, a mouse, a trackerball, a stylus, a voice recognition device, and/or may be implemented as a touch screen in GUI 220.

Input device 216 and GUI 220 may allow a user of user device 204a to interface with at least a portion of system 200. For example, graphical user interface 220 may display an input field 222, and a user may use input device 216 to input a transaction code in input field 222 to navigate to a different screen on graphical user interface 220. Memory device 210 may also include a tracker log file 224 that may store usage information regarding various users of user device 204a. User device 204a may also include additional components, and user devices 204b-n may also include memory devices, processors, and application programs as described above with respect to user device 204a.

User devices 204a-n may communicate with repositories 206a-n via communication network 202. The communication includes sending data, such as issuing a navigation query to server 206, and receiving data, such as receiving a result of the executed navigation query, from repository 206a. Repositories 206a-n may be used to classify, manage, and store data objects in databases. Repositories 206a-n may be located in different regions and may be a database management system such as MaxDB from SAP AG. Repository 206a may include a memory device 226 and one or more processor(s) 228. Memory device 226 may include a fuzzy search engine 230, database table(s) 232, and other application programs (not shown), which may be executed using processor(s) 228.

Fuzzy search engine 230 may perform a process of approximate string matching by finding approximate matches to a pattern identified based on a string input by a user. The string may be, for example, an incomplete word or a misspelled word, or a complete word and the pattern may include terms related to the incomplete, misspelled, and/or a complete word. The pattern may include similarly sounding words, and/or words with similar spellings or meanings. While performing the process of fuzzy searching, fuzzy search engine 230 may locate web pages, articles, screens, images, documents, and other similar data objects that may be relevant to the pattern. Once relevant information is located, fuzzy search engine 230 may return a list including web pages, articles, screens, images, documents, and other similar data objects that may be ranked based on a degree of relevance with the pattern.

Fuzzy search engine 230 may include preference instructions 234, a ranking module 236, an adjustment module 238, and a notification module 240. Preference instructions 234 may include usage information such as results of past navigation queries, language preferences of various users whose navigation queries were previously processed by fuzzy search engine 230, a default master language preference, and other similar information. Preference instructions 234 may be stored and updated regularly during operation of fuzzy search engine 230 and/or may be updated based on data stored in tracker log file 224. Ranking module 236 may assist in generating results in response to a navigation query based on various metrics such as Damerau Levenshtein distances, and may use preference instructions 234 to rank results when execution of a navigation query results in multiple matches.

Adjustment module 238 may be used to adjust search parameters and a level of fuzziness used to search for an appropriate transaction code when a user does not input an exact transaction code in input field 222. Notification module 240 may generate various notifications including clickable options to receive feedback from a user during execution of a navigation query.

Database table(s) 232 may be used to store transaction code(s) 242, descriptive text 244 associated with transaction codes 242, metadata 246, foreign key(s) 248, associated screen(s) 250, and a predetermined criteria 260. Transaction code(s) 242 may be of a predetermined format, set by an administrator, and may be associated with specific screens such that each transaction code may be unique to a specific screen included in associated screen(s) 250. When a navigation query may include one of the unique transaction code(s) 242, fuzzy search engine 230 may execute the navigation query and may return a result including data representing a screen from associated screen(s) 250 that may cause displaying of the requested screen on GUI 220. Associated screen(s) 250 may include a collection of data objects that may represent various screens and/or may include instructions that may be executed to retrieve and assemble data objects from repositories 206*b-n* to generate screens.

Descriptive text 244 may include text in various languages and may be associated with transaction code(s) 242. For example, a transaction code "/BAOF/EC" may be associated with descriptive text "Electronic Checklist." Each transaction code may have unique descriptive text or multiple transaction codes may have similar or identical descriptive text. Metadata 246 may describe the schema of database table(s) 232 and may be used to reflect the structure in which transaction code(s) 242, descriptive text 244, and data objects representing associated screen(s) 250 may be stored in. Metadata 246 may describe fields, columns, and rows that may be used to arrange transaction code(s) 242, descriptive text (244), foreign key(s) 248, and associated screen(s) 250 in database table(s) 232. Metadata 246 may be used by fuzzy search engine 230 to retrieve data from database table(s) 232 during execution of a navigation query.

Predetermined criteria 260 may be a threshold value that may be set by an administrator, and may be used to determine whether input text included in a navigation query 254 received from user device 254 is accurate or not. The threshold value may represent a degree of match between the input text and a transaction code stored in transaction code(s) 242.

The relationships and associations between transaction code(s) 242, descriptive text 244, data objects representing associated screen(s) 250, and predetermined criteria 260 may include constraints that may be enforced by using foreign key(s) 248. For example, when a user attempts to delete a transaction code 242, the foreign key may prevent the deletion of the transaction code until corresponding descriptive text 244, and an associated screen 250 is also deleted. Similarly, foreign key(s) 248 may ensure that insertion of a new transaction code and/or modification of an existing transaction code may also be accompanied with similar insertions and/or modifications with respect to descriptive text 244 and/or associated screens 250.

An administrator of system 200 may only provide authority to limited users for modifying content stored in database table(s) and a record of all modifications may be stored in modification log 252. Modification log 252 may include information describing a type of change, an identifier describing the identity of the user who made the change, a time the change was made, and an option that when exercised by the administrator or another user of similar authority may cause the change to be reversed.

Although the exemplary embodiment of system 200 is illustrated as having particular components arranged in a particular manner, one skilled in the art will appreciate that system 200 may include additional or fewer components that may be arranged differently. For example, user devices 204*a-n* and repositories 206*a-n* may include additional processors and/or memory devices. System 200 may be implemented as a standalone station such that instructions to implement fuzzy search engine 230, database table(s) 232, and modification log 252 may be included in a single user device 204*a*. System 200 may include additional user devices and/or repositories, and may be implemented in a client/server arrangement. Memory devices 210 and 226 may include all forms computer-readable storage mediums such as of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, application program 218 may be executed on processor 212 to display input field 222 on GUI 220. Subsequently, a user of user device 204*a* may use input device 216 to input text in input field 222 to navigate to a desired screen. The text may be a transaction code or a partial transaction code. Upon receipt of the text, processor 212 may generate a navigation query 254 that may be sent to repository 206*a* over communication network 202.

Navigation query 254 may be received by fuzzy search engine 230 and the transaction code or partial transaction code may be extracted from the fuzzy search engine 230. Fuzzy search engine 230 may use the extracted transaction code as a search parameter to find a matching transaction code in transaction code(s) 242. Fuzzy search engine 230 may use metadata 246 to determine the schema and structure of the database table(s) 232 to facilitate search operations. When the extracted code is a complete and accurate transaction code a matching transaction code may be found in transaction code(s) 242 and fuzzy search engine 230 may generate a response 256. The extracted code may be determined to be accurate based on a comparison with a threshold value set as predetermined criteria 260. For example, the input text included in navigation query 254 may be determined to satisfy the predetermined criteria when the input text may be determined to exactly match a particular transaction code 242. In addition, the threshold value may be set to a level such that the input text may be determined to satisfy the predetermined criteria when ninety-five percent, eighty percent, and/or any similar percentage of characters included in the input text may be determined to match a particular transaction code 242.

Response 256 may include data representing a screen that may be retrieved from associated screen(s) 250 and may be sent to user device 204*a* over communication network 202. Retrieving an associated screen may include resolving a database constraint represented by foreign key(s) 248.

A new screen may be displayed on GUI 220 based on data included in response 256. In addition, notification module 240 may generate a notification 258 and include it in response 256 such that a message may be displayed along with the new screen on GUI 220. Notification 258 may include a message requesting the user to confirm whether the new screen being displayed is the screen that the user had requested. Notification 258 may further include an option that may allow the user to confirm that the new screen is accurate, and may include an additional option that may allow the user to request generation of a new navigation query because the new screen may be incorrect. A record of the transaction may be stored in tracker log file 224 and preference instructions 234 along with an indication that the navigation was executed successfully or unsuccessfully.

When navigation query 254 includes a partial or incorrect code and matching transaction code is not found in transaction code(s) 242, fuzzy search engine 230 may use various modules to generate an appropriate response. Navigation query 254 may also include only a descriptive textual term and no partial transaction code or a partial transaction code and a descriptive textual term. The partial or incorrect code may be determined to be inaccurate based on a comparison with a threshold value set as predetermined criteria 260. For example, the input text included in navigation query 254 may fail to satisfy the predetermined criteria when the input text may be determined to not exactly match a particular transaction code 242 or when a percentage of matching characters may be determined to be lower than the threshold value.

In addition, when navigation query 254 may only include a partial or incorrect code, notification module 240 may generate a notification 258 that may be sent to user device 204a to prompt the user to provide a descriptive textual term because the transaction code was incorrect or partial.

To generate an appropriate response, ranking module 236 may use preference instructions 234 to determine a language preference of a particular user. Repository 206a may send a message to user device 204a to determine a language preference of the user based on information stored in tracker log file 224 and/or preference instructions 234 may indicate a language preference of the particular user based on the language in which the user logged on to user device 204a. Preference instructions 234 may also indicate a language preference based on activity history of the user indicating a language that has been frequently used by the particular user in the past. If preference instructions 234 cannot determine what language the user logged on and/or what language a particular user used most frequently, preference instructions 234 may indicate the language preference to be a master language preference. Master language preference may be a default language setting that may be set by an administrator.

Ranking module may generate a list of fuzzy transaction codes that may be potentially associated with the partial transaction code included in navigation query 254. For example, if a user entered a partial transaction code "SE2", ranking module 236 may determine that associated fuzzy transaction codes include "SE24," "SE21", "SE22", "SE20," and additional similar fuzzy transaction codes. The fuzzy transaction codes may have corresponding transaction code(s) 242 that may be associated with descriptive text 244 stored in database table(s) 232. The association between transaction code(s) 242 and descriptive text 244 may be maintained by implementing constraints using foreign key(s) 258.

Ranking module 236 may scan descriptive text 244 stored in database table(s) 232 based on one or more of an indication of the language preference by preference instructions 234, the list of fuzzy transaction codes generated by ranking module 236, and/or a descriptive textual search term provided by the user. Ranking module 236 may only scan descriptive text 244 associated with the list of fuzzy transaction codes to determine if there is a match between the descriptive textual search term and descriptive text 244 associated with the fuzzy transaction codes. Depending on a number matches or "hits" in an initial hit list ranking module 236 may increase or decrease the number of fuzzy transaction codes and may scan descriptive text 244 corresponding to additional fuzzy transaction codes. Ranking module 236 may also change the indicated language preference based on the number of results in the initial hit list and may perform additional scanning using different language preferences. For example, if preference instructions 234 indicated the language preference to be the current login language, ranking module 236 may change the language preference to the most frequently used language of a particular user or to the master language and perform additional scanning to refine the results included in the initial hit list.

The initial hit list may include multiple matched transaction codes because a plurality of transaction codes may have similar or identical descriptive textual 244. Ranking module 236 may further refine the initial hit list based on usage information stored in preference instructions 234. For example, preference instructions 234 may include a record of the usage history of the particular user who logged on to user device 204a or a record of transactions that have been performed by user device 204a. Similar usage information may also be retrieved from tracker log file 224. If no usage information relating to a particular user and/or user device 204a is included in preference instructions 234, preference instructions 234 may also include cumulative usage information. Cumulative usage information may also be used to supplement the usage information of a particular user such that a high weight is attached to the usage information of a particular user and a lower weight is assigned to the cumulative usage information during ranking of the multiple matched transaction codes on the initial hit list.

Cumulative usage information may include transaction history information corresponding to multiple users whose navigation queries have been processed by fuzzy search engine 230. Ranking module 236 may use the usage information of the particular user and/or the cumulative usage information to refine the initial hit list. After refining the initial hit list, ranking module may retrieve data from associated screen(s) 250 that may represent a screen associated with the transaction code with the highest rank in the refined initial hit list. A response 256 including the retrieved data and/or a notification 258 requesting feedback from a user may be sent to user device 204a. A new screen may be displayed on GUI 220 based on the retrieved data included in response 256. Further, a notification 258 requesting feedback may also be displayed on GUI 220 and a record of the transaction may be stored in tracker log file 224 and preference instructions 234. A user may have an option to switch off generation of notifications, if the user does not wish to provide feedback. Tracker log file 224 may automatically generate feedback and categorize a result as a success depending on whether an amount of time a user spends on a particular screen is greater that a predetermined threshold.

In the alternative, response 256 may only include the refined initial hit list and notification module 240 may include a notification 258 in response 256 prompting the user to select a transaction code from the refined initial hit list. Once the user selects a transaction code from the refined initial hit list, a message may be sent to repository 206a and a response may be generated by repository 206a based on the selected transaction code. The response may include data representing an associated screen that may then be displayed on GUI 220.

During processing of a navigation query an adjustment module 238 may be implemented to adjust the level of fuzziness used to generate fuzzy transaction codes. For example, upon generation of a list of fuzzy transaction codes notification module 240 may send the list of fuzzy transaction codes to be displayed on user device 204a. Using input device 216, a user may adjust the level of fuzziness by eliminating one or more fuzzy transaction codes from the list and/or a user may provide additional description text.

Further, a user may adjust the level of fuzziness by using a sliding scale to increase or decrease a level of association between the entered transaction code and the fuzzy transaction codes, and the entered descriptive textual term and the fuzzy descriptive text. For example, a user may set the level of fuzziness at 0 which may represent that only the exact transaction code or the exact word included in the descriptive text may be used as search parameters. A fuzziness level of 1 may increase the pool of related or associated fuzzy transaction codes and words included in fuzzy descriptive text. For example, a transaction code "SE2" and descriptive text "change" with a fuzziness level of 1 may include fuzzy transaction codes such as "SE20," "SE21," "SE22," . . . "SE2n," and may include fuzzy words including "changing," "changes," "changed," and/or other similar terms. A fuzziness level of 2 may increase the number of transaction codes to "SE20" . . . "SE2n" and "SE201" . . . "SE20n" and fuzzy words including "changing," "changes," "changed," and/or synonyms of the word "change."

A user of user device 204a may also be given an option of adjusting a level of fuzziness before a navigation query 254 is sent to repository. In addition, the user may also be given an option to limit searching of transaction codes in particular categories and/or formats. For example, a user may limit the search to: transaction codes including or excluding a symbol; transaction codes having a set number of characters; transaction codes belonging to a particular category such as software items provided by an organization; transaction codes including only a set number of alphabets, and other similar limiting parameters. Such adjustment parameters and a selected level of fuzziness may be received by adjustment module 238 when a navigation query 254 is first received and/or during processing of navigation query 254 and/or after the navigation query is processed and the search results were unsatisfactory. Adjustment module 238 may provide the adjustment parameters to ranking module 236 during various stages of navigation query processing to ensure that the navigation query is executed based on the adjusted search parameters.

Notification module 240 may also generate a notification 258 including an error message when no results are generated during execution of navigation query 254. The error message may also include an option allowing the user to adjust search parameters and to re-submit the navigation query with adjusted search parameters.

Further, a user may generate a request to modify using application program 218 to update, insert, and/or delete transaction code(s) 242, descriptive text 244, and data representing associated screen(s) 250. The request may be sent to repository 206a and processor 228 may determine whether the user or user device 204a that issued the request has authority to make the requested change. The request may be executed after resolution of constraints represented by foreign key(s) 248 that may ensure that data integrity is maintained in database table(s) 232. A record of the change along with additional information may be stored in modification log 252. An administrator may be able to review the change and may be able to reverse the change at a subsequent time if he or she does not approve of the change.

Figure 3:
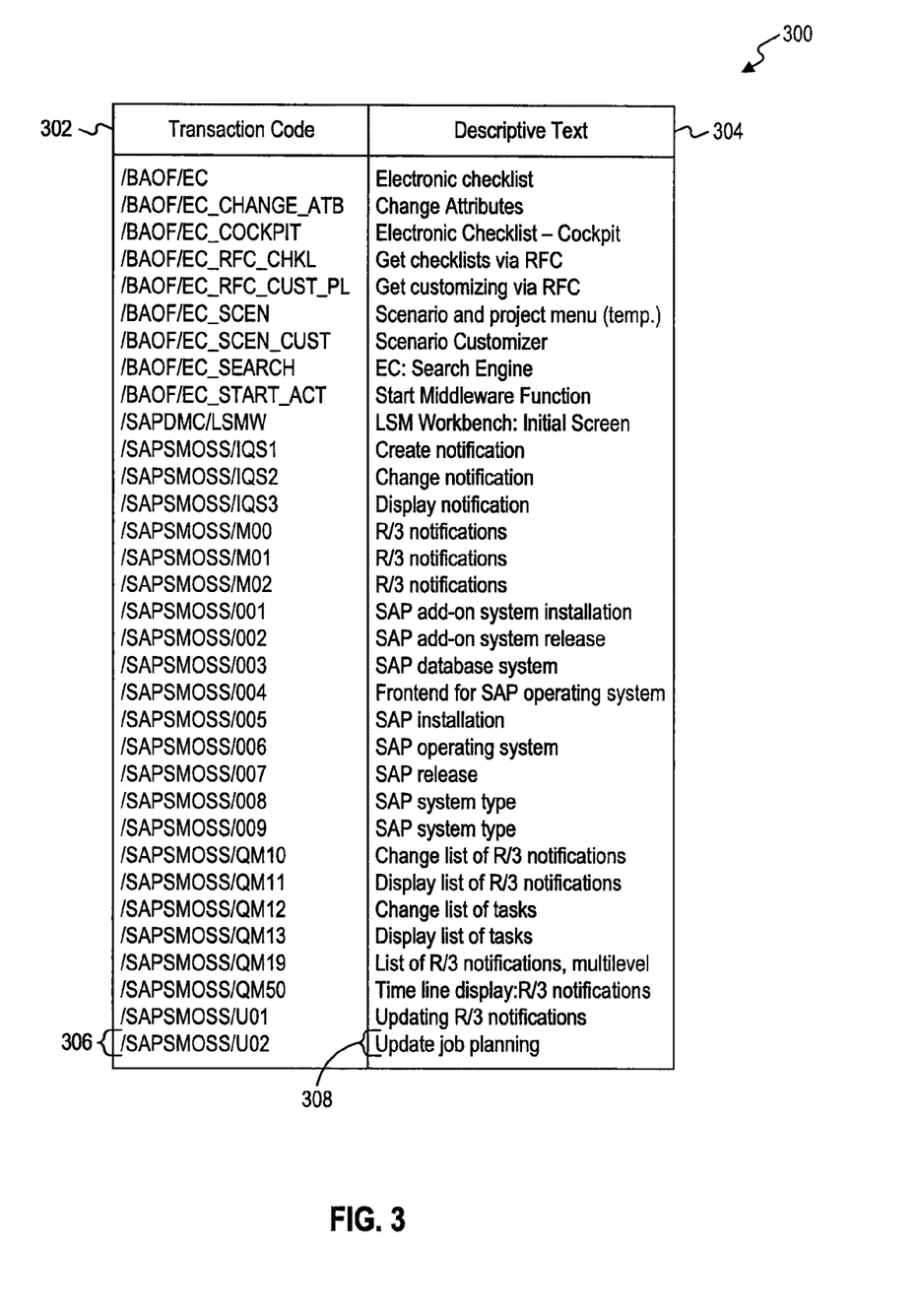
FIG. 3 illustrates an exemplary database table representing relationships between transaction codes and associated descriptive text, consistent with the invention.

Referring now to FIG. 3, an exemplary database table 300 representing relationships between transaction codes and descriptive text is illustrated. For example, database table 300 may include a first column 302 including transaction codes and a second column 304 including description text. Transaction codes may be of a predetermined format and may include alphabets and numbers. Different segments of a transaction code may represent various categories of data. For example, transaction code 306 may be "/SAPSMOSS/U02." Transaction code 306 may include a segment "SAP" that may represent an organization, thus transaction codes including "SAP" may limit searching to databases of the named organization. In addition, segment "SMOSS" may represent a specific directory located within databases of the named organization, and segment "U02" may represent a particular functionality that may be implemented using a screen corresponding to transaction code 306.

Column 304 may include description text that may describe a particular transaction code and may be associated with the transaction code included in the same row of database table. For example, transaction code 306 may be associated with descriptive text 308. Descriptive text may be used to facilitate processing of navigation queries as described above with respect to FIG. 2.

Figure 4:
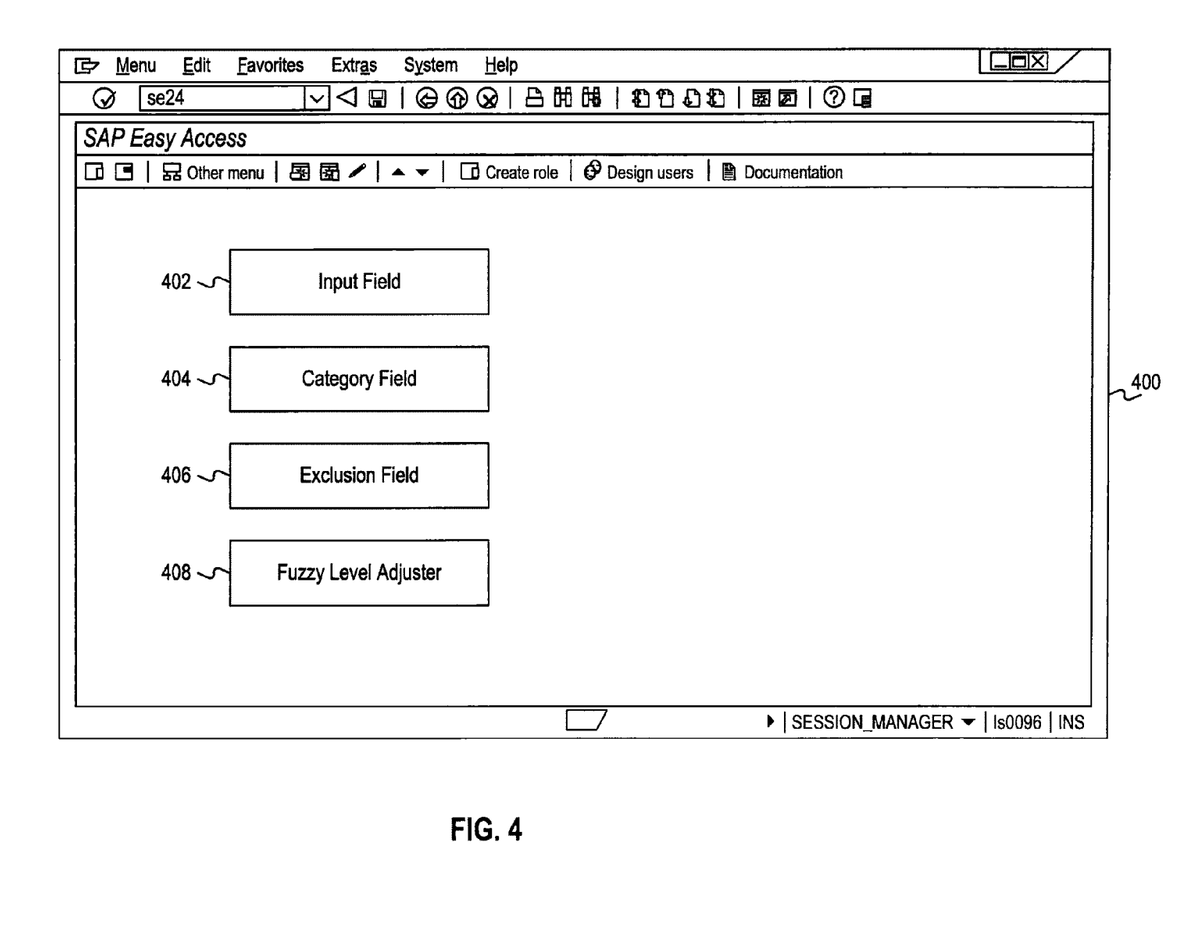
FIG. 4 illustrates an exemplary screen used to navigate to a desired screen, consistent with the invention.

FIG. 4 illustrates an exemplary screen 400 used to navigate to a desired screen. Screen 400 may include an input field 402, a category field 404, an exclusion field 406, and a fuzzy level adjuster 408. Fields 402, 404, 406, and 408 may be implemented using drop down menus, circular bars, scroll bars, and/or similar types of fields. Input field 402 may allow a user to enter a transaction code, a partial transaction code, and/or descriptive text required to navigate to a desired screen.

Category field 404 may provide the user an option to limit searching to particular categories of databases. For example, a user may limit the searching to only databases that include information regarding software products offered by an organization. In addition, category field 404 may allow the user to limit the searching to a particular data range within certain named databases. Exclusion field 406 may provide the user an option to enter terms that the user does not want to be used as a search parameter. For example, a user may include a word or a transaction code that may be considered to be a fuzzy search term and may be displayed on screen 400 in a drop-down menu (not shown) when a user inputs a partial transaction code in input field 402. The user may exclude such terms by entering them in exclusion field 406. Fuzzy level adjuster 408 may be used by a user to adjust a level of fuzziness that may be used to increase or decrease the number of fuzzy search terms as described above with respect to FIG. 2.

Figure 5:
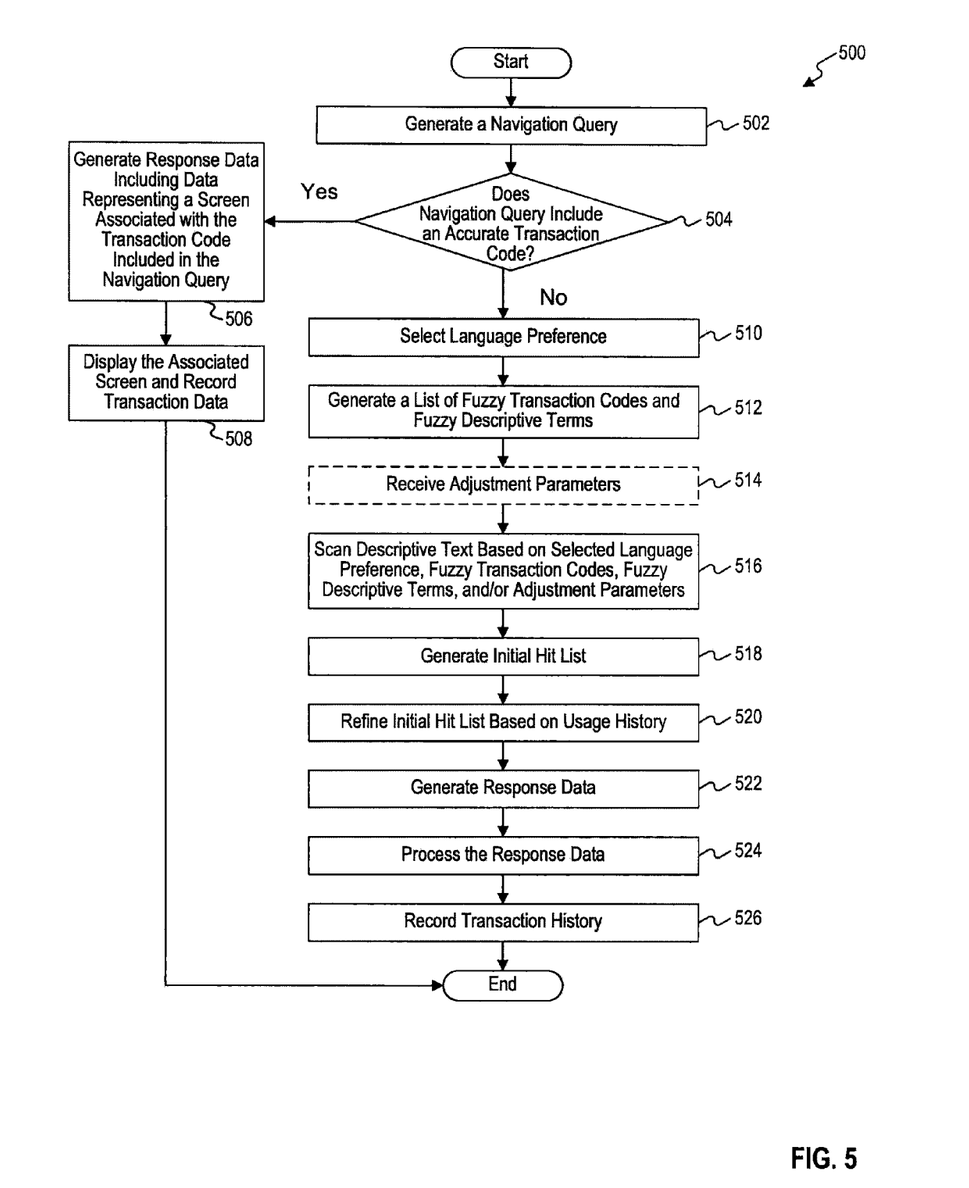
FIG. 5 illustrates a flowchart illustrating an exemplary process 500 for executing a navigation query based on a transaction code, consistent with the present invention.

Referring now to FIG. 5, it illustrates an exemplary flowchart of a process 500 for executing a navigation query based on a transaction code. Process 500 may be implemented using system 200 or other systems known to those of skill in the art. The process may begin in step 502 where a navigation query including text inputted by a user may be generated. The navigation query may be generated by, for example, user device 204a. The text may include a transaction code or a partial transaction code, and/or descriptive text. Next, it may be determined whether the navigation query includes an accurate transaction code (step 504). Step 504 may be performed based on a threshold value set as the predetermined criteria. The process may move to step 506 when it may be determined that the navigation query includes an accurate transaction code (step 504: Yes), and response data including data representing a screen associated with the transaction code may be generated. Next, in step 508, the associated screen may be displayed and a record of the transaction may be stored. The screen may be displayed on, for example, GUI 220 of system 200 and a record of the transaction may include feedback received from the user indicating that the displayed screen was accurate.

Returning now to step 504, the process may determine that the transaction code included in the navigation query is not accurate (step 504: No), and a language preference may be selected (step 510). The transaction code may be determined to be inaccurate when it is a partial transaction code. Further, the navigation query may include descriptive text instead of the transaction code or may include both a partial transaction code and descriptive text. If navigation query does not include descriptive text process 500 may also include a step (not shown) of generating a notification to request inputting of descriptive text from a user. In step 510, language preference may be selected based on a current login language of the user, or a language in which a user frequently logs on, or a master language that indicates a default language preference.

Next, in step 512, a list of fuzzy transaction codes and fuzzy descriptive terms may be generated. These fuzzy terms may be generated based on the partial transaction code and/or descriptive text included in navigation query. Step 514 may be optional and may include receiving adjustment parameters from a user. The adjustment parameters may be used to adjust a level of fuzziness and/or may be used to decrease or increase the scope of the search. For example, a user may exclude one or more fuzzy terms and/or limit the search to a particular database.

In step 516, descriptive text associated with the transaction codes may be scanned based on the selected language preference, fuzzy transaction codes, fuzzy descriptive terms, and/or adjustment parameters. The descriptive text may be scanned to determine a number of matches or hits between the search terms and data stored as descriptive text. Next, in step 518, an initial hit list may be generated based on the number of matches or hits. In step 520, the initial hit list may be refined and items on the hit list may be ranked. The initial hit list may be refined based on usage history of a particular user and/or cumulative usage history of multiple users. Step 520 may be skipped if the initial hit list includes only one item.

Next, in step 522, response data may be generated based on the refined initial hit list. Response data may include data representing a screen associated with the highest ranked item on the refined initial list. Response data may also include a notification requesting feedback from a user. In the alternative, response data may include the refined initial hit list with a notification requesting a user to select one of the items. Further, if the initial hit list and/or refined initial hit list does not include any items response data may include an error message requesting the user to input a different transaction code and/or additional descriptive terms.

In step 524, the response data may be processed. Processing the response data may include, for example, displaying a screen associated with a transaction code, receiving a selection from a user of an item included in a refined initial hit list and retrieving data representing a screen associated with the selected item, and/or generating a new navigation query based on additional descriptive terms inputted by a user. Next, in step 526, the transaction history may be recorded and the process may end. The transaction history may include feedback received from a user indicating that the displayed screen was accurate or inaccurate.

Figure 6:
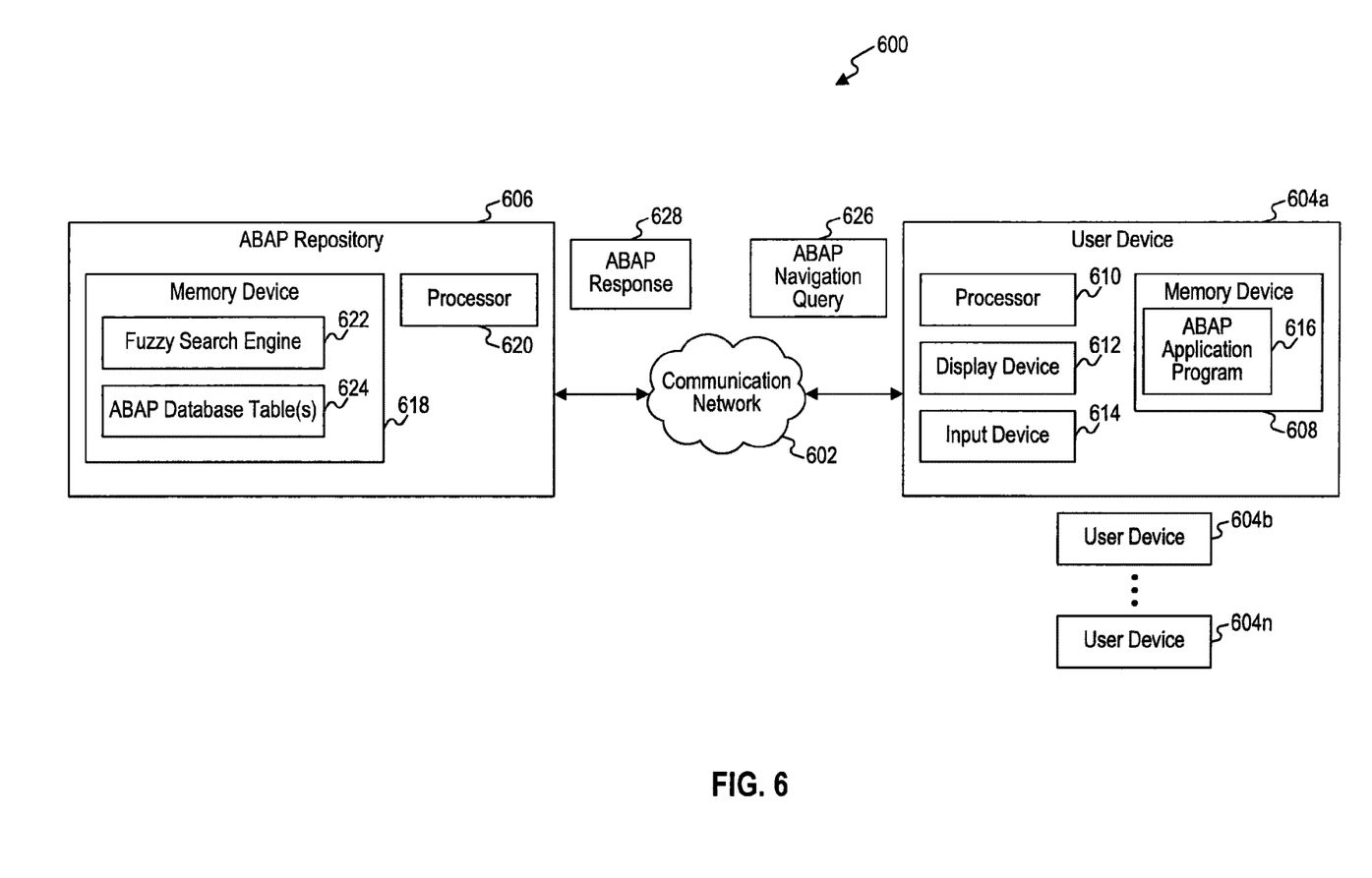
FIG. 6 illustrates an exemplary system for optimizing execution of navigation queries during operation of a software based on Advanced Business Application Programming (ABAP) language, consistent with the present invention.

FIG. 6 illustrates an exemplary system for optimizing execution of navigation queries during operation of an ABAP application program. System 600 may include components similar to the ones disclosed in FIG. 2. For example, system 600 may include a communication network 602 that facilitates communication between user device 604*a-n* and ABAP repository 606. User device 604*a* may include a memory device 608, a processor 610, a display device 612, and an input device 614.

Memory device 608 may be used to store instructions, such as an ABAP application program 616, which may be executed by processor 610 to cause user device 604*a* to implement a plurality of operations. ABAP application program 616 may be based on a concept of Logical Databases (LDBs), which facilitate in extraction of data from specific databases. For example, ABAP application program 616 may be customized for specific end-users and may be used to interface with databases specific to a particular organization and/or an end user and processor 610 may be configured to operate as database interface during operation of ABAP application program 616. System 600 may also include an ABAP repository node 606, which may include a memory device 618 and a processor 620. Memory device 618 may include a fuzzy search engine 622 and ABAP database tables(s) 624.

Consistent with an embodiment of the invention, system 600 may operate similar to system 200 and may execute navigation queries to generate ABAP screens on display device 612. For example, as is described in detail above with respect to system 200, user device 604*a* may generate an ABAP navigation query 626. ABAP navigation query 626 may be received by ABAP repository 606 and an ABAP response 628 may be generated by ABAP repository 606 after processing of the ABAP navigation query 626. ABAP response 628 may include data representing a screen associated with a transaction code and/or one or more notifications requesting further action by a user.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable storage media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method of executing a navigation query, comprising:
   receiving a navigation query including input text;
   determining, via a processor, whether the input text satisfies a predetermined criteria;
   generating a response including data representing a screen associated with the input text when the input text satisfies the predetermined criteria, wherein the input text includes a transaction code associated with the screen;
   selecting a language preference when the input text fails to satisfy the predetermined criteria, wherein the failed input text includes a partial transaction code and textual information;
   generating a list of fuzzy search terms based on the partial transaction code and the textual information;
   performing a fuzzy search based on the language preference and by scanning a database including descriptive text associated with transaction codes to determine a number of matches between the fuzzy search terms and the descriptive text;
   generating an initial hit list including the number of matches; and
   refining the initial hit list based on a usage history to generate a response to the navigation query.

2. The method of claim 1, wherein refining the initial hit list includes ranking the number of matches based on a preference instruction.

3. The method of claim 1, further comprising:
   changing the language preference when the number of matches in the initial hit list are greater than a predetermined number.

4. The method of claim 1, wherein the usage history includes transaction information of a user providing the input text and transaction information of an additional user.

5. The method of claim 1, further comprising:
   displaying the list of fuzzy search terms;
   receiving, before scanning the database, an adjustment parameter to adjust a level of fuzziness of the fuzzy search terms; and
   scanning the database based on the adjusted level of fuzziness.

6. The method of claim 1, wherein the navigation query includes an adjustment parameter, and performing the fuzzy search includes using the adjustment parameter.

7. The method of claim 1, further comprising:
   generating a notification requesting input of textual information when the input text fails to satisfy the predetermined criteria.

8. The method of claim 1, wherein the language preference is selected based on a current login language of a user.

9. The method of claim 1, wherein the language preference is selected based on a previously used login language of a user or a master language.

10. The method of claim 1, wherein the response generated based on the result of the fuzzy search includes transaction codes and a notification instructing a user to select one of the transaction codes.

11. The method of claim 1, wherein the response generated based on the result of the fuzzy search includes data representing the screen associated with a transaction code included in the result of the fuzzy search.

12. The method of claim 1, further comprising:
   displaying the screen;
   receiving feedback from a user regarding the displayed screen; and
   storing the feedback for updating the language preference.

13. A system for executing a navigation query, comprising:
   a memory device having instructions to implement a fuzzy search engine; and
   a data processor for executing the instructions and causing the fuzzy search engine to:
   receive a navigation query including input text;
   determine whether the input text satisfies a predetermined criteria;
   generate a response including data representing a screen associated with the input text when the input text satisfies the predetermined criteria, wherein the input text includes a transaction code associated with the screen;
   select a language preference when the input text fails to satisfy the predetermined criteria, wherein the failed input text includes a partial transaction code and textual information;
   generate a list of fuzzy search terms based on the partial transaction code and the textual information;
   perform a fuzzy search based on the language preference and by scanning a database including descriptive text associated with transaction codes to determine a number of matches between the fuzzy search terms and the descriptive text;
   generate an initial hit list including the number of matches; and
   refine the initial hit list based on a usage history to generate a response to the navigation query.

14. The system of claim 13, wherein the initial hit list is refined by ranking the number of matches based on a preference instruction.

15. The system of claim 13, wherein the fuzzy search engine is executed on the data processor to:
   change the language preference when the number of matches in the initial hit list are greater than a predetermined number.

16. The system of claim 13, wherein the usage history includes transaction information of a user providing the input text and transaction information of an additional user.

17. The system of claim 13, wherein the fuzzy search engine is executed on the data processor to:
   display the list of fuzzy search terms;
   receive, before scanning the database, an adjustment parameter to adjust a level of fuzziness of the fuzzy search terms; and
   scan the database based on the adjusted level of fuzziness.

18. A non-transitory computer-readable storage medium comprising instructions, which when executed on a processor, cause the processor to perform a method of executing a navigation query, the method comprising:
   receiving a navigation query including input text;
   determining whether the input text satisfies a predetermined criteria;
   generating a response including data representing a screen associated with the input text when the input text satisfies the predetermined criteria, wherein the input text includes a transaction code associated with the screen;
   selecting a language preference when the input text fails to satisfy the predetermined criteria, wherein the failed input text includes a partial transaction code and textual information;
   generating a list of fuzzy search terms based on the partial transaction code and the textual information;
   performing a fuzzy search based on the language preference and by scanning a database including descriptive text associated with transaction codes to determine a number of matches between the fuzzy search terms and the descriptive text;

generating an initial hit list including the number of matches; and refining the initial hit list based on a usage history to generate a response to the navigation query.

* * * * *